United States Patent [19]

Russo et al.

[11] Patent Number: 5,308,389
[45] Date of Patent: May 3, 1994

[54] METAL APPEARANCE COMPOSITION

[75] Inventors: Joseph M. Russo, The Woodlands; Randall R. Hendrix, Spring, both of Tex.

[73] Assignee: Pennzoil Products Company, Houston, Tex.

[21] Appl. No.: 878,694

[22] Filed: May 5, 1992

[51] Int. Cl.⁵ .................. B05D 3/00; B05D 7/16; C09D 5/08
[52] U.S. Cl. ................. 427/385.5; 427/388.4; 427/421; 106/14.11; 106/14.15; 106/14.21; 252/305
[58] Field of Search .............. 106/14.11, 14.15, 14.21; 427/421, 385.5, 388.4; 252/387, 390, 394, 305; 524/317, 364, 377, 428

[56] References Cited

U.S. PATENT DOCUMENTS

| | | | |
|---|---|---|---|
| 4,157,991 | 6/1979 | Pilla | 106/14.29 |
| 4,180,491 | 12/1979 | Kim et al. | 524/317 |
| 4,318,833 | 3/1982 | Guagliardo | 524/457 |
| 4,365,028 | 12/1982 | Leep et al. | 523/402 |
| 4,476,271 | 10/1984 | Kano et al. | 524/377 |
| 4,517,326 | 5/1985 | Cordts et al. | 106/15.05 |
| 4,584,021 | 4/1986 | Bartlett | 106/14.15 |
| 4,696,763 | 9/1987 | Bentley et al. | 106/14.14 |
| 4,719,036 | 1/1988 | Clubley et al. | 106/14.23 |
| 4,722,966 | 2/1988 | Flakus | 524/840 |
| 4,774,141 | 9/1988 | Matsui et al. | 428/414 |
| 4,781,293 | 11/1988 | Johns | 206/441 |
| 4,816,124 | 3/1989 | Manabe et al. | 204/192.14 |
| 4,849,458 | 7/1989 | Reed et al. | 521/59 |
| 4,872,910 | 9/1989 | Eshleman et al. | 106/10 |
| 4,915,228 | 4/1990 | Johns | 206/441 |

FOREIGN PATENT DOCUMENTS

| | | |
|---|---|---|
| 0131721 | of 1984 | Fed. Rep. of Germany. |
| 53-127545 | of 1978 | Japan. |
| 53-129235 | 11/1978 | Japan ............ 106/14.05 |
| 60-110972 | of 1985 | Japan. |
| 61-223195 | of 1986 | Japan. |
| 62-79243 | of 1987 | Japan. |

*Primary Examiner*—Mark L. Bell
*Assistant Examiner*—Anthony J. Green
*Attorney, Agent, or Firm*—Lowe, Price, LeBlanc & Becker

[57] ABSTRACT

A water-based composition for spraying on a surface such as an automobile engine, to provide a flexible protective film thereon comprises a water dispersible polyurethane elastomer, an anti-corrosive agent, a thickener, a dispersing agent, an antifreeze agent, and water.

15 Claims, No Drawings

METAL APPEARANCE COMPOSITION

TECHNICAL FIELD

The present invention relates to a composition useful to impart a glistening appearance to surfaces such as automobile engine surfaces, and more particularly relates to a composition which will impart a glistening, shiny appearance to metal and other surfaces such as automobile engine surfaces and provide the surface with a protective and glossy coating.

BACKGROUND

A problem which has always existed in the automotive field is that automotive engines accumulate dirt, oil and grease, which tend to prevent heat transfer and contribute to warmer running engines. Further, the accumulation of dirt, oil and grease detracts from the appearance of the engine and is a detriment during maintenance.

Various preparations and techniques have been used over the years to clean such engines without having to remove the engine from the vehicle and submerging in solvent. For example, flushing the engine with a water hose, physically scraping the engine and application of various liquid compositions have all been utilized in attempts to degrease or clean automobile engines.

Engine cleaners may be generally classified as all solvent-based types or all water-based types. Such known compositions generally include detergents and/or combinations of solvents with aqueous detergents. Solvent-based cleaners are generally used by spraying on the engine by a conventional means. Before the solvent runs off the engine, it is sprayed or flushed with water to form an emulsion with the solvent to give better cleaning action.

Water-based products are known to be used to clean engines and such products have good wetting ability and cleaning power. Water-based products generally contain water soluble detergents and, while effective to remove dirt, are not as effective on oil and grease. Combinations of solvents and detergents are also known in the prior art which is usually in the emulsion form.

A further problem in cleaning of automobile engines is the appearance. It is desirable to maintain a good appearance of the engine as the accumulation of oil, grease and dirt over time adversely affects the appearance and adversely affects maintenance.

It is also desirable among automobile enthusiasts to maintain an attractive appearance for automobile engines, especially in show cars and the like. The present invention provides a composition which provides an attractive and shiny coating to an automobile engine.

DISCLOSURE OF INVENTION

It is accordingly one object of the present invention to provide a water-based composition which imparts an attractive appearance to metal and other surfaces.

It is a further object of the invention to provide a composition which is low in volatile organic compounds and when applied to a surface, provides a flexible non-yellowing high gloss film which is tack free in a short period.

A still further object of the invention is to provide a composition which will enhance the appearance of a surface such as an automobile engine and protect rubber and plastic parts on the engine from wear.

An even further object of the invention is to provide a method for coating an automobile engine by application of a water-based composition thereto to impart to the engine a glistening appearance.

According to the present invention, there is provided an aqueous-based composition which provides a flexible film on a metal surface on application thereof, the composition comprising:

A. a water dispersible polyurethane elastomer;
B. an anti-corrosive agent;
C. a thickener;
D. a dispersing agent;
E. an antifreeze agent; and
F. water.

Also provided by the present invention is a method for improving the appearance of metal surfaces such as automobile engines by applying the composition of this invention to the surface, permitting the composition to remain on the surface for a short period to dry.

DESCRIPTION OF PREFERRED EMBODIMENTS

In accordance with the present invention, there is provided a composition which will provide a flexible film on a metal surface by application of the composition thereto. The film provides a glistening sheen or shiny appearance to the surface.

The composition of this invention comprises a water dispersible polyurethane elastomer, an alkanolamine, a thickener, a dispersing agent, an antifreeze component, and water. Therefore, the composition is water-based and does not contain volatile organic compounds which are detrimental to the environment. On application to a metal surface such as an automobile engine, the composition provides a very flexible, non-yellowing high gloss film which is tack free in less than two hours and usually in forty to ninety minutes.

The composition of this invention forms a coating which protects the plastic and rubber parts of an automobile engine while at the same time enhancing the appearance of the engine. A preferred composition of the invention will contain the following components:

| Component | Amount wt. % | Preferred Amount wt. % |
| --- | --- | --- |
| Polyurethane Elastomer | 25–40 | 28–35 |
| Anti-corrosive Agent | 1.0–3.0 | 1.5–2.5 |
| Thickener | 0.1–2.0 | 0.5–1.5 |
| Distilled Water | 40–70 | 50–60 |
| Dispersing Agent | 0.1–10 | 3–9 |
| Antifreeze Agent | 0.5–2.0 | 0.5–1.5 |
| Defoamer | 0–1.0 | 0–1.0 |
| Wetting Agent | 0.5–3.0 | 0.5–2.0 |

The composition is effective to apply the polyurethane elastomer as a non-yellowing coating on a surface such as an automobile engine or any parts with which the composition comes into contact. The polyurethane elastomer is a water dispersible polyurethane elastomer. The polyurethane forms a high gloss, non-yellowing flexible protective film on the plastic, rubber and metal surfaces of an auto engine. The polyurethane elastomer is of the conventional type prepared by reaction of diisocyanates and polyesters. It is essential that the polyurethane elastomer be dispersible in aqueous solution. Particularly preferred polyurethane elastomer are fully reacted aliphatic, thermoplastic urethanes dispersed in a blend of water, an N-alkyl pyrrolidone such as N-methyl pyrrolidone, and amines. An example of a preferred polyurethane is Reichhold Spensol L52.

The composition will also preferably contain an anti-corrosive agent such as an alkanolamine in an amount of about 1.0–3.0 weight percent, and more preferably in an amount of 1.5–2.5%. The alkanolamine functions as an anti-corrosive agent for the composition. Any equivalent anti-corrosive agent may be used in the present invention. The alkanolamine is of the general formula:

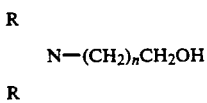

wherein R is hydrogen, lower alkyl or lower branched alkyl and n is 1 to 6. The preferred materials of this group are ethanolamine, N-methyl ethanolamine, N,N-dimethyl ethanolamine, N-ethyl ethanolamine, N-methyl-N-ethyl-ethanolamine, N-propyl ethanolamine, N-(t-butyl) ethanolamine, etc. A more preferred material is N,N-diethyl ethanolamine.

The composition will also contain about 0.1 to 2.0 weight percent, and more preferably 0.5–1.5 wt. % of a thickener. Any conventional thickener may be used which will increase the viscosity of the composition. Thickeners useful in the present invention include nonionic synthetic water soluble polymers such as polyethers, polyurethanes, and more particularly, a polyether-polyurethane associative thickener such as Union Carbide UCAR SCT 200 or SCT 270. Also contemplated are thickeners incorporating cellulosic material such as hydroxyalkyl cellulose. Examples of such hydroxyalkyl celluloses include hydroxymethyl cellulose, hydroxypropyl cellulose or more preferably hydroxyethyl cellulose. The thickener may also be guar gum.

The composition will also contain about 0.1–10 weight percent of a dispersing agent, and more preferably 3–9 wt. % of a dispersing agent, in order to form a suitable dispersion with the polyurethane elastomer and water. A preferred dispersant is a glycol ether. Particularly preferred dispersants include the lower branched or unbranched alkylene glycol ethers such as propylene glycol t-butyl ether, and dipropylene glycol monomethyl ether.

The composition will also contain about 0.5–2.0 weight percent of an antifreeze component, and more preferably 0.5–1.5 wt. % of an antifreeze component. The antifreeze component may be alkylene glycols or lower molecular weight poly alkylene glycols. Examples of such glycols include ethylene glycol and propylene glycol. A preferred glycol is polypropylene glycol having a molecular weight of 725.

Further, the composition may contain up to 1.0 percent of a defoamer. Preferred defoamers include acetylenic surfactants, for example. Particularly preferred defoamers are available from Air Products and include Surfynol DF-10L.

The composition should further include 0.5–3.0 weight percent of a wetting agent, and more preferably 0.5–2.0 wt. % of a wetting agent in the formulation. Preferred wetting agents include any nonionic surfactant, for example, and especially an acetylenic surfactant such as Air Products Surfynol 440.

The composition of the invention is made by blending the water dispersible polyurethane elastomer, the anti-corrosive agent, the thickener, the dispersing agent, antifreeze agent, wetting agent, defoamer and water.

The composition is then packaged in an aerosol can using a nitrogen propellant.

In a particularly preferred method of making the composition, the components are formed in three individual parts; the water, alkanolamine and thickener as one part, the polyurethane elastomer, coupling agent and dispersing agent as the second part, and the defoamer and wetting agent as the third part. These separate parts are then blended and placed in the aerosol can for use.

The product is used by spraying on an engine which has been previously cleaned by a conventional detergent system known to the art. When applied and allowed to dry, the composition will provide a high gloss non-yellowing flexible protective film on all surfaces to which it is applied. Since the composition contains very low amounts of volatile organic compounds and nitrogen is used as the propellant, the product is non-ozone depleting, is safe to the environment and less hazardous to the user.

The invention will now be described with reference to certain preferred embodiments; however as obvious variations thereon will become apparent to those skilled in the art, the invention is not to be considered as limited thereto.

EXAMPLE 1

The following composition was prepared:

| Component | Weight Percent |
| --- | --- |
| Part A | |
| Distilled water | 55.6 |
| N,N-Diethyl ethanolamine | 2.0 |
| Union Carbide UCAR SCT 200 | 1.0 |
| Total Part A | 58.6 |
| Part B | |
| Reichold Spensol L52 | 30.0 |
| Arcosolv DPM (Dipropylene glycol monomethyl ether) | 1.5 |
| Arcosolv PTB (Propylene glycol t-butyl ether) | 7.5 |
| Polypropylene glycol 725 | 1.0 |
| Total Part B | 40.0 |
| Part C | |
| Air Products Surfynol DF-10L | 0.4 |
| Air Products Surfynol 440 | 1.0 |
| Total Part C | 1.4 |
| Total | 100.0 |

Part A, Part B and Part C were blended to form a dispersion. This dispersion is then placed in an aerosol can with a nitrogen propellant. When sprayed on a clean automobile engine, the product formed a non-yellowing high gloss, flexible protective film on the surface.

The invention has been described herein with reference to certain preferred embodiments; however as obvious variations thereon will become apparent to those skilled in the art, the invention is not to be considered as limited thereto.

What is claimed is:

1. A composition for spraying on a surface to provide a flexible protective film on said surface, the composition comprising the following components:

| Component | Amount - Weight Percent |
| --- | --- |
| Polyurethane | 25–40 |
| Anti-corrosive Agent | 1.0–2.0 |

-continued

| Component | Amount - Weight Percent |
| --- | --- |
| Thickener | 0.1–2.0 |
| Distilled Water | 40–70 |
| Dispersing Agent | 0.1–10 |
| Antifreeze Agent | 0.5–2.0. |

2. A composition according to claim 1 wherein the composition also contains a defoamer in an amount of 0–1.0 weight percent.

3. A composition according to claim 1 wherein the composition also contains a wetting agent in an amount of 0.5 to 3.0 weight percent.

4. A composition according to claim 1 wherein the anti-corrosive agent is an alkanolamine.

5. A composition according to claim 4 wherein the alkanolamine is N,N-diethyl ethanolamine.

6. A composition according to claim 1 wherein the dispersing agent is a glycol ether.

7. A composition according to claim 5 wherein the dispersing agent is propylene glycol t-butyl ether or dipropylene glycol methyl ether.

8. A composition according to claim 1 wherein the antifreeze agent is an alkylene glycol.

9. A composition according to claim 6 wherein the antifreeze agent is polypropylene glycol.

10. An article of manufacture comprising a composition of claim 1 contained in an aerosol container with a propellant.

11. An article of manufacture according to claim 10 wherein the propellant is nitrogen.

12. A method for forming a protective non-yellowing film on a surface which comprises applying a composition of claim 1 to the surface, and permitting the composition to remain on the surface to dry.

13. A method according to claim 12 wherein the surface is metal.

14. A method according to claim 13 wherein the surface is an automobile engine.

15. A method according to claim 12 wherein the composition is applied by spraying from an aerosol container containing the composition.

* * * * *